United States Patent [19]
Kolbe et al.

[11] Patent Number: 5,602,817
[45] Date of Patent: Feb. 11, 1997

[54] APPARATUS AND METHOD FOR ENHANCING PLAYBACK FIDELITY OF COMPACT DISKS

[75] Inventors: Harry Kolbe; Jerome J. Podwil, both of New York, N.Y.

[73] Assignee: Kolbe-Podwil Sonics, Inc., New York, N.Y.

[21] Appl. No.: 228,506

[22] Filed: Apr. 15, 1994

[51] Int. Cl.$^6$ .................................................. G11B 3/58
[52] U.S. Cl. ............................................................ 369/72
[58] Field of Search .................. 369/72–73; 15/1.51, 15/1.52; 361/212, 225, 230

[56] References Cited

U.S. PATENT DOCUMENTS

| | | | |
|---|---|---|---|
| 2,991,331 | 7/1961 | Ross | 369/73 |
| 4,083,073 | 4/1978 | Bernardini | 15/1.5 A |
| 4,139,201 | 2/1979 | English | 369/73 |
| 4,198,061 | 4/1980 | Dunn | 369/73 |
| 4,835,808 | 6/1989 | Hahne et al. | 369/73 |
| 5,136,558 | 8/1992 | Getreuer et al. | 369/44.15 |
| 5,231,622 | 7/1993 | Hayashi | 369/72 |

FOREIGN PATENT DOCUMENTS

| | | | |
|---|---|---|---|
| 55-28582 | 2/1980 | Japan | 369/73 |
| 61-51629 | 3/1986 | Japan | 369/72 |

OTHER PUBLICATIONS

"Bedini" Clarifier 2 Owner's Manual, publication date as early as Dec. 1992 (exact publication date unknown).
JCB, Inc., Brochure and Specification Sheet for "Bedini" Laser Disk Stabilizer (or Electronic Stabilizer), publication as early as Dec. 1992 (exact publication date unknown).

*Primary Examiner*—John H. Wolff
*Assistant Examiner*—Brian E. Miller
*Attorney, Agent, or Firm*—Browdy and Neimark

[57] ABSTRACT

A method and apparatus improve the playback fidelity and quality of a compact disk player by controlling charge conditions in the zone of interaction between the playback read head and a CD. In one form of apparatus, an electrode is associated with the read head, and an ion generator coupled to the electrode provides an electrostatic field. The introduction of random noise to the field potentiates or enhances the improvement.

15 Claims, 2 Drawing Sheets

APPARATUS AND METHOD FOR ENHANCING PLAYBACK FIDELITY OF COMPACT DISKS

BACKGROUND OF THE INVENTION

This invention relates to apparatus and a method for enhancing the playback fidelity of digital disks. Such disks, also called "laser disks", "compact disks" or simply "CD's", are widely used for musical recording as well as video and information storage and retrieval.

A CD typically consists of a recording medium of transparent plastic, associated with a layer of protective material. Data, which in the case of audio recording constitutes an acoustic waveform expressed in digital (binary) code, is placed on the recording medium as a series of microscopic "pits" of differing lengths and constant depth. The pits are arranged in a spiral track around the center of the disk. A reflective coating is applied to the pitted surface, and the protective layer is applied over that. The pits are typically between about 1 and 3 micrometers in length and about 0.5 micrometers wide. In playback, a laser beam is focused on the pit track from beneath the rapidly spinning disk, and "reads" the pits and the spaces between them, by sensed reflection, as a stream of "zeros" and "ones". The track is scanned at a constant linear rate of about four feet/second, a rate which translates into rotation when sensing is at the center at about 500 revolutions per minute, slowing to about 200 revolutions per minute as scanning reaches the outer periphery of the disk.

SUMMARY OF THE INVENTION

The inventors have observed that the spinning of the disk generates, at and around the surface of the disk, an electrostatic field, and that by controlling the field conditions as described herein, playback fidelity can markedly be improved.

Tests have demonstrated that under certain conditions a spinning CD, within a period of 5 to 10 seconds, builds up a positive charge of 300 to 600 volts. Neutralization of that charge has been found effective, for reasons not yet perfectly understood, to markedly improve the fidelity and quality of the played-back sound. In general, therefore, in its broadest aspect, the present invention provides methods for improving the output fidelity of playback apparatus for a CD by controlling the field conditions at and around the surface of the disk. In accordance with the present method, an electrostatic field is interposed between the read head and the surface (area) of the disk so that the field impinges upon at least the sector of the disk which is about to be scanned by the laser beam. The interposed electrostatic field is so charged as to oppose and be capable of neutralizing the preexisting electrostatic field which may have been generated in the space between the read head and the disk in proximity to the disk-reading laser beam.

Another aspect of the present invention involves introduction into the space between the surface of the disk and the read head, in proximity to the disk-reading laser beam, a magnetic field adapted to surround the beam. Such magnetic fields have been found to facilitate transmission of the laser beam.

A third aspect of the invention in a presently preferred form involves the step of introducing into the electrostatic field interposed between the read head and the surface of the disk a controlled amount of random noise. Such a step appears to augment or potentiate the overall enhancement effects derived from the present method.

In accordance with the invention, the interposed electrostatic field may be generated by means of an electrode associated with the read head, or less desirably, by a any alternative means such as a radioactive source or chemical agent. In its apparatus aspect, the present invention involves providing, in association with the read head of a CD playback apparatus, a means for generating an electrostatic field in the space between the read head and the spinning disk. The field impinges on at least the area of the disk which is about to be scanned by the disk-reading laser, and is so charged that it tends to neutralize the electrostatic field which typically preexists in that space.

Products such as chemically impregnated cloths, disk cleaning or treating agents, and discontinuous magnetic treatments for disks, have been proposed, all ostensibly to improve the sonic performance of CD's. In general, however, such products and techniques have had only limited efficacy. In some instances they have provided some discernible improvement for a short time or a limited number of "plays" of the disk, but none is known to be capable of providing long-term or constant benefit.

BRIEF DESCRIPTION OF THE DRAWINGS

For the purpose of illustrating the invention, there are shown in the drawings forms of the invention which are presently preferred. It should be understood, however, that the invention is not limited to the precise arrangements and instrumentalities shown.

DETAILED DESCRIPTION

Figure 1:
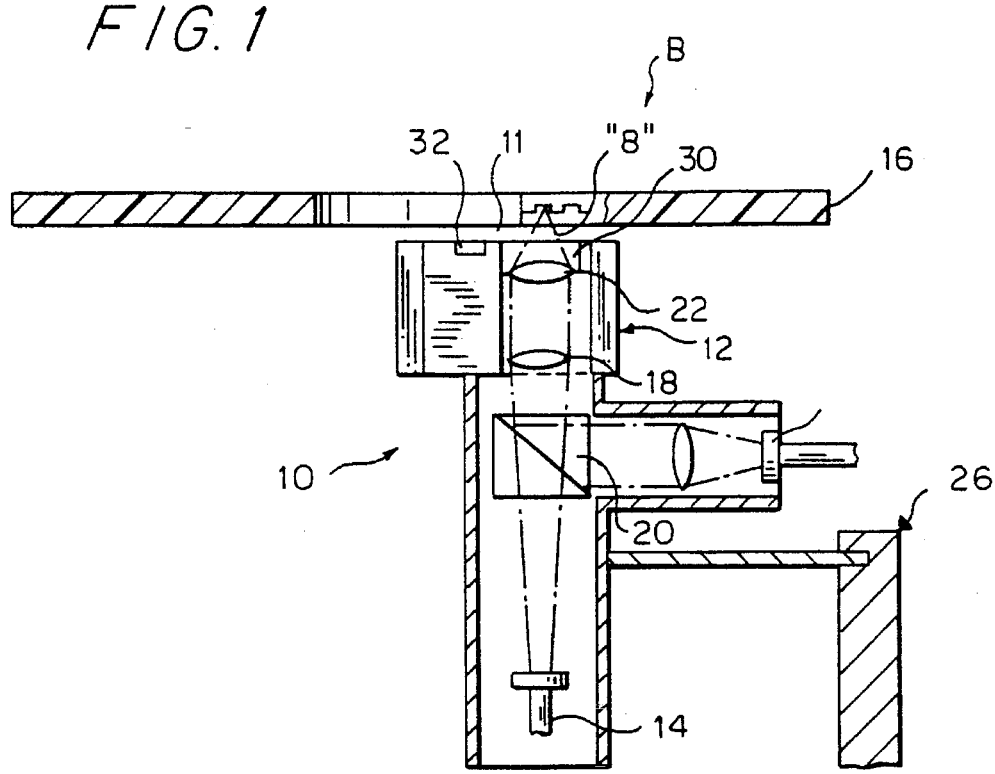
FIG. 1 is a diagrammatic side elevation view, illustrating the optical readout system for a typical CD.

Referring now to the drawings in detail, wherein like elements are designated by like reference numerals, there is seen in FIG. 1, diagrammatically, an exemplary CD playback apparatus, designated generally by the reference numeral 10.

The apparatus 10 comprises a read head, designated generally by the reference numeral 12. A laser source 14 is associated with the read head 12. The laser source 14 provides a laser beam "B", focused on the underside of the mirrored pits and flats of a CD 16 from beneath the disk. The beam "B" is directed through a suitable optical train, including, typically, a collimating lens or lenses 18, a beam splitting prism 20 and an objective or focusing lens 22. Optically coupled to the beam splitting prism 20 is a photodiode 24. As is conventional, light from the beam "B" reflected back from the pits (not shown) through the underside of the disk 16 is directed by the prism 20 to a photodiode 24, which, in effect, creates a binary output signal indicative of the presence or absence of a pit.

Omitted for clarity in FIG. 1 is a focus mechanism associated with the objective lens 22, by which focus of the laser beam "B" on the pits is constantly maintained.

Shown diagrammatically in FIG. 1 is a tracking mechanism 26, which causes the read head 12 and its structure to traverse the radius of the disk 16 as associated the disk 16 is read from its inner to its outer edge.

Figure 2:
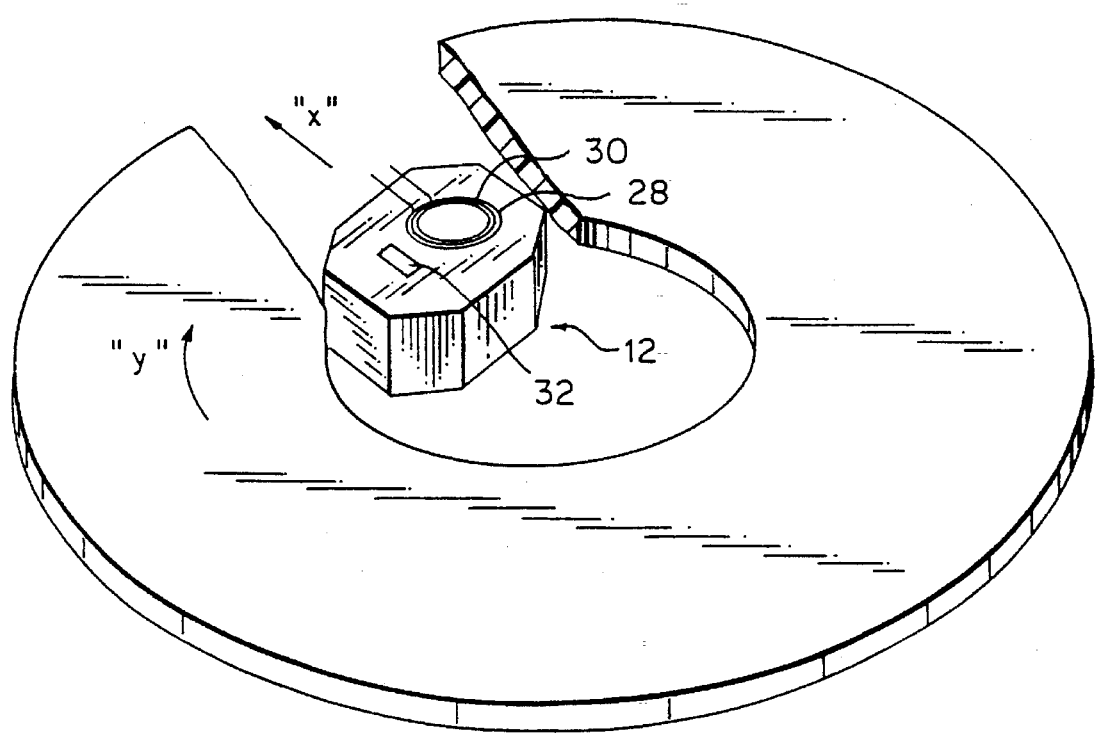
FIG. 2 is a perspective view, partly broken away, showing the orientation of a read head and a CD in one embodiment of the invention.

Referring now to FIG. 2, an arrow "X" (also seen in FIG. 3) depicts the tracking movement of the read head 12, and an arrow "Y" depicts the direction of rotation, or spin, of the disk 16 relative to the read head 12.

Figure 3:
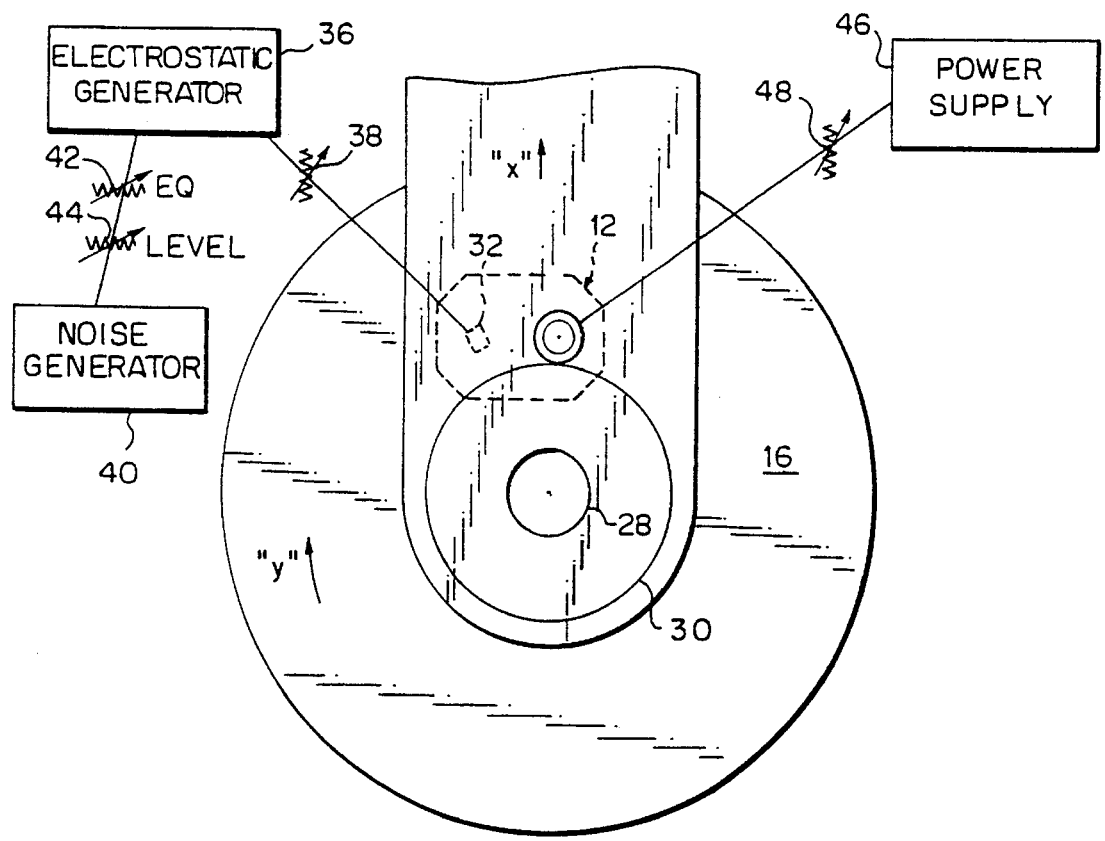
FIG. 3 is a top plan view, also diagrammatic, showing, among other -things, the relationship in the present invention between the location of a field generating electrode and the about-to-be read sector of a rotating CD.

Further details of one presently preferred embodiment of the present invention are seen in FIGS. 2 and 3. Thus, referring again to FIG. 2, read head 12 has an opening 28 from which the laser beam "B" emerges. Within and surrounding the opening 28 in the embodiment illustrated in FIG. 2 is a helically wound coil 30 of fine insulated copper wire, with an inside diameter sufficient to surround the objective lens 22 of the read head 12. Also associated with the read head 12 in the illustrated embodiment is an electrode 32, described in greater detail below.

The electrode 32 must be positioned so that the field generated by the electrode impinges upon the about to be read sector of the CD 16 prior to its being read. Also, it appears on the basis of tests that the electrode 32 is preferably relatively small, perhaps with a surface area half that of the lens 22. The electrode 32 is preferably mounted in close proximity to the CD 16 (within about one mm. to two mm.) such as schematically illustrated in FIGS. 1 and 2.

FIG. 3 illustrates, by means of functional blocks, aspects of the configuration and operation of the above-described components. Referring now to FIG. 3, electrically coupled to the electrode 32 is an electrostatic field generator 36 of conventional type, preferably provided with a variable power supply in the range of −100 volts D.C. to −750 volts D.C. Such a range of power supply enables a large selection of field charge conditions at the surface of the CD. Since the power supply is variable, a listener can optimize the effect produced by the electrode 32.

A control element 38, depicted for convenience as a rheostat, controls the output of the electrostatic generator 36. Associated with the electrostatic generator 36, for a purpose to be described shortly, is a white noise generator 40, coupled to a .variable equalizer depicted by the reference numeral 42. In one operative embodiment, the output of the noise generator 40 is variable from 0 to 80 volts RMS, and the equalizer 42 is of the treble and bass boost and cut type familiar to those skilled in the art. A control element 44 controls the output level of the noise generator 40. The noise generator 40 serves to introduce into the electrostatic field a controlled amount of random noise. The application of such random noise to the electrostatic field produced by the apparatus or in accordance with the method appears to augment or potentiate the enhanced playback fidelity and quality produced by the present invention.

Figure 4:
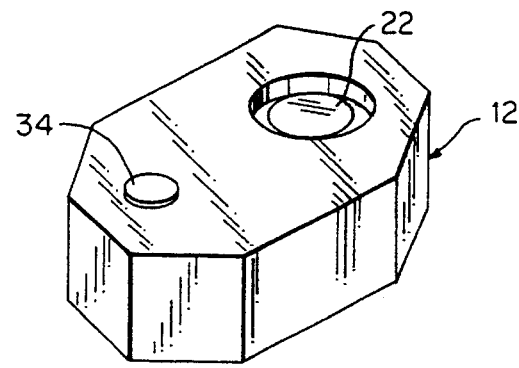
FIG. 4 is a perspective view of a part of the read head assembly of a playback mechanism in another embodiment of the invention.

FIG. 4 illustrates an alternative embodiment of the invention in which a read head 12' is provided with a source of ionizing nuclear radiation. In one presently preferred embodiment, the source, designated in FIG. 4 by the reference numeral 34 comprises a small quantity of americium, of the kind commonly found in smoke detector devices. Such sources typically have radioactivity of about 0.1 microcurie.

Associated with the above-mentioned electromagnetic coil 30 is a variable D.C. power supply 46, controlled by a control element 48, preferably sufficient to provide from the coil an effective field strength on the order of 0.5 to 2.0 oersted. The coil 30 provides a cylindrical magnetic field which surrounds and is oriented parallel to the laser beam "B", and the field is oriented so that its north pole is adjacent the CD 16.

Fixed magnets, properly aligned and suitably shielded, can be used to achieve the focusing effect obtained by means of the coil 30. Such an alternative, however, is more difficult to implement than the use of a coil, and it affords no variability in magnetic field strength. Due to individual personal preferences with respect to sonic performance, and differences in recording and CD production methods, it is desirable that the system have the capability of varying the magnetic field to optimize playback performance.

Experiments involving the introduction, by means of the coil 30, of a magnetic field into the space 11 between the CD disk 16 and the read head 12, suggest that such magnetic fields significantly potentiate and assist the improved playback performance obtained by controlling the electrostatic field conditions existing in the space 11. It is hypothesized that a correctly oriented low intensity magnetic field in the space 11 has a focusing effect upon the electrostatic charges within the space 11. Thus, it is surmised that the focusing field imposes organization upon the charges at the surface of the CD disk, aligning the charges into chains parallel to the magnetic lines of force. It is not our intent, however, that we be limited to any particular theory of operation of the present method and apparatus Although disclosed in connection with conventional CD's of the kind used to record music, it should be understood that the principles of the invention may be applied to laser-read storage media in other operative environments. Examples are CD-ROM, used in computers and multi-media devices.

The present invention may be embodied in other specific forms without departing from its spirit or essential attributes. Accordingly, reference should be made to the appended claims, rather than the foregoing specification, as indicating the scope of the invention.

We claim:

1. A method for improving the output fidelity of playback apparatus for a compact disk, wherein the playback apparatus comprises a read head juxtaposed to and spaced from the surface of the disk and the read head provides a laser beam for scanning a sector of the disk, and means for rotating the disk relative to the read head, comprising the steps of:

interposing between the read head and the surface of the disk an electrostatic field;

positioning the field so that the field impinges upon at least the sector of the disk which is about to be scanned by the laser beam;

causing the electrostatic field to be so charged that it opposes preexisting electrostatic fields in the space between the read head and the disk;

introducing into the space between the surface of the disk and the read head in proximity to the laser beam a magnetic field interacting with the laser beam; and introducing random noise into said electrostatic field.

2. A method in accordance with claim 1, wherein said electrostatic field interposed between the read head and the surface of the disk is to be negatively charged.

3. A method in accordance with claim 2, wherein said electrostatic field is generated by an electrode coupled to the read head.

4. A method in accordance with claim 2, wherein said electrostatic field is generated by a source of ionizing nuclear radiation coupled to the read head.

5. A method in accordance with claim 1 wherein said magnetic field is made to surround the laser beam and is of a strength of about 0.5 to 2.0 oersted.

6. In a playback apparatus for a compact disk, comprising a read head juxtaposed to and spaced from a surface of a disk when the disk is operatively disposed, the playback apparatus providing means for rotating the disk and the head having associated therewith a laser source providing a laser beam for scanning the disk as the disk moves relative to the read head, a device for improving the output fidelity of the playback apparatus, said device comprising electrostatic field generating means coupled to the read head for generating an electrostatic field in the space between the read head and the disk in the vicinity of the laser beam so that said electrostatic field impinges on at least that area of the disk which is about to be scanned by the laser beam, said electrostatic field being so charged that it opposes an electrostatic field preexisting in the space between the read head and the disc in the vicinity of the laser beam;

means coupled to said read head for providing a magnetic field in the space between said read head and a disk to be read, in operative association with the laser beam; and a noise generator operatively associated with said electrostatic field generating means for introducing random noise into the electrostatic field.

7. Apparatus in accordance with claim 6, wherein the electrostatic field generated by said means for generating an electrostatic field is negatively charged.

8. Apparatus in accordance with claim 7, wherein said means for generating an electrostatic field comprises an electrode coupled to said read head.

9. Apparatus in accordance with claim 6, wherein said means coupled to said read head provides a magnetic field surrounding the laser beam and having a strength of about 0.5 to 2.0 oersted.

10. Apparatus in accordance with claim 6, wherein said means for generating an electrostatic field comprises at least one electrode coupled to said read head and said means coupled to said read head for providing a magnetic field comprises a magnetic coil adjacent to the laser beam.

11. Apparatus in accordance with claim 6, wherein said means coupled to said read head provides a magnetic field strength of about 0.5 to 2.0 oersted.

12. Apparatus in accordance with claim 6, wherein said means coupled to said read head for providing a magnetic field comprises a coil surrounding the laser beam.

13. Apparatus in accordance with claim 6, wherein said means for generating an electrostatic field comprises a source of ionizing nuclear radiation coupled to the read head.

14. Apparatus in accordance with claim 13, wherein said source comprises americium.

15. Apparatus in accordance with claim 13, wherein said source has radioactivity of about 0.1 microcurie.

* * * * *